UNITED STATES PATENT OFFICE.

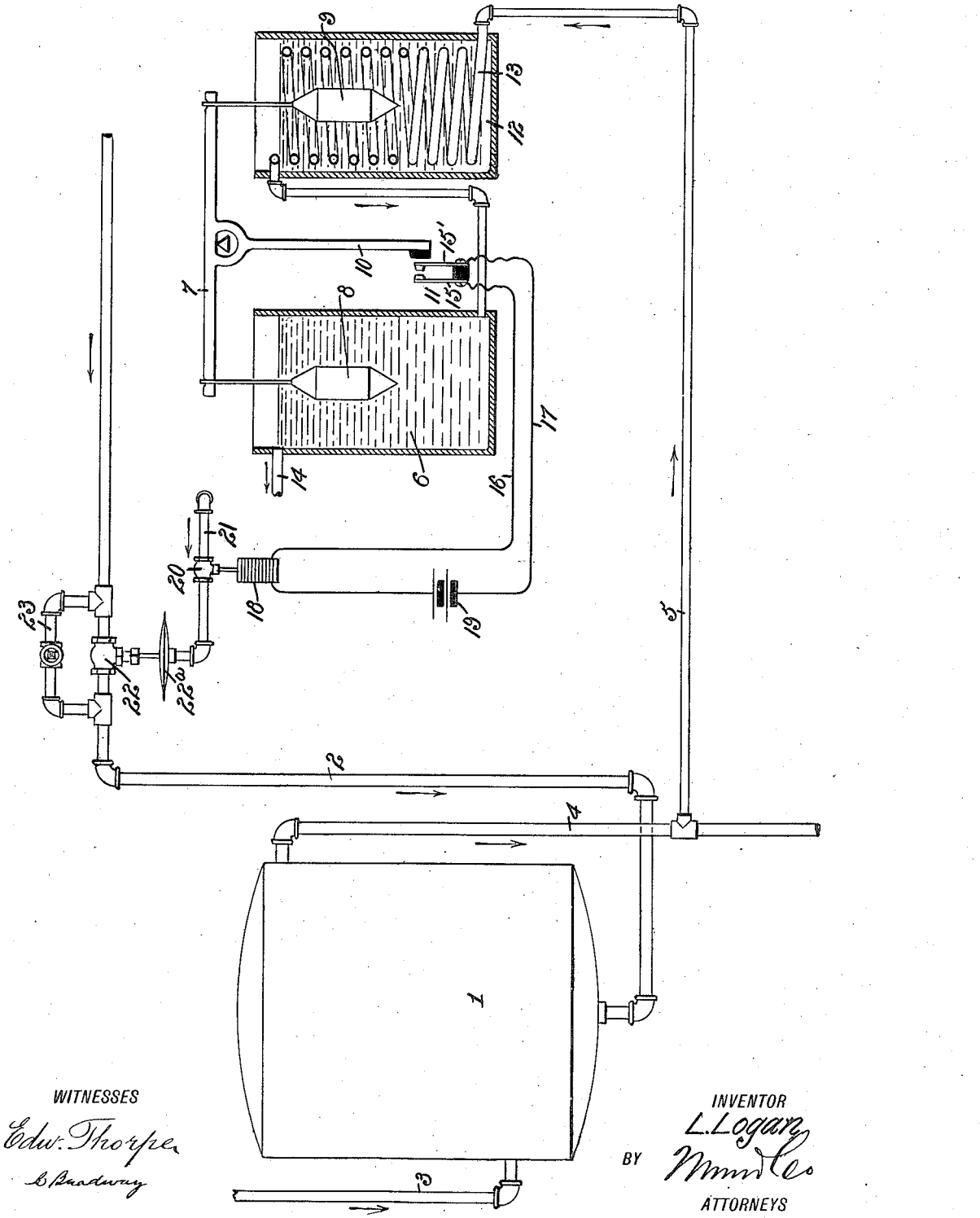

LLOYD LOGAN, OF SYRACUSE, NEW YORK.

SOLUTION-SPECIFIC-GRAVITY-REGULATING APPARATUS.

1,210,180. Specification of Letters Patent. Patented Dec. 26, 1916

Application filed July 12, 1916. Serial No. 108,967.

*To all whom it may concern:*

Be it known that I, LLOYD LOGAN, a subject of the King of Great Britain, and a resident of Syracuse, in the county of Onondaga and State of New York, have invented a new and Improved Solution-Specific-Gravity-Regulating Apparatus, of which the following is a full, clear, and exact description.

This invention relates to an apparatus for automatically regulating the specific gravity of a solution or liquid mixture during the continuous production thereof.

The invention has for its general objects to provide a novel, simple and reliable apparatus embodying means responsive to the variations in the specific gravity of the product, such as a hydrometer or specific gravity balance, and means for pneumatically, electromagnetically or otherwise operating valves or other devices for the purpose of automatically securing a product of the desired composition and density by regulating the supply of one or more or all of the component parts of which the solution is made.

In carrying out the invention in an absorption system, as for instance, the mixing of ammonia gas and water, the solution is caused to flow continuously through a tank in which is submerged a bob of a specific gravity balance, and the movement of the beam of the balance controls an electric circuit which operates a pilot valve in a fluid pipe, whereby fluid pressure is brought to bear on the diaphragm of a regulator in the water supply pipe or the gas supply pipe, and consequently the specific gravity can be regulated to a nicety by the opening and closing of the electric circuit due to movements of the balance beam. The invention, however, may be employed to regulate the feeding of a solid into a solution; to admit steam into stills; to regulate the speed of mixers or other machinery; to operate recording mechanism, and in fact to regulate any part of any process which affects the specific gravity of a liquid product. The advantages of the method of control are the entire elimination of the manual operation of valves, saving in attendance, greater sensibility of operation, and ability to operate continuously at the maximum capacity of the absorption.

For a more complete understanding of the invention, reference is to be had to the following description and accompanying drawing, which is a diagrammatic view of a gas absorption system embodying the improvements.

Referring to the drawing, 1 designates an absorption tank to which water is supplied through the pipe 2 and gas through the pipe 3, the gas bubbling up through the water and becoming absorbed therein. The solution of gas and water overflows through a pipe 4 which has a branch 5 leading to a tank or receptacle 6 through which a continuous flow is maintained. This receptacle 6 forms part of a specific gravity balance comprising a beam 7 and bobs 8 and 9 suspended from the ends thereof, and on the beam is an arm 10 which is adapted to operate an electric switch 11. The bob 8, which is of the same weight and displacement as the bob 9, is submerged in the receptacle 6 filled with the solution to be tested, and the bob 9 is submerged in a receptacle 12 which contains a standard solution or one of fixed specific gravity. It is important that the temperature of this standard solution in the receptacle 12 be maintained at substantially the same temperature as the solution flowing from the mixing tank 1 and therefore the pipe 5 includes a coil 13 disposed in the receptacle 12, and this coil is connected with and discharging into the receptacle 6, which has an overflow or return pipe 14.

The switch 11 comprises normally separated contacts 15 and 15' connected with the wires 16 and 17 leading to an electromagnetic device 18, there being a source of current 19 in this circuit. The device 18 controls a valve 20 of a pipe 21 connected with a source of air or other fluid under pressure (not shown) and leading to a pressure control valve 22 in the water supply pipe 2, whereby the quantity of water supplied to the tank 1 can be regulated, but it is to be understood that the valve 22 may be arranged in the gas supply pipe or both the gas and water may be controlled. Around the valve 22 may be arranged a manually controlled by-pass 23.

In operation the solution when it becomes more concentrated than desired will differ in specific gravity from the solution in the tank 12, so that the poise of the bobs 8 and 9 will be disturbed, causing the beam 7 to oscillate and close the circuit at the switch 11. The valve 20 is thus opened so that the fluid pressure acts on the diaphragm $22^a$ of the valve 22 and opens such valve to allow more water to flow into the tank 1 to weaken the solution. As soon as the solution weakens to the desired extent, the switch 11 will open by reason of the balance being restored. In this way the solution can be maintained substantially constant within narrow limits.

From the foregoing description taken in connection with the accompanying drawing, the advantages of the construction and method of operation will be readily understood by those skilled in the art to which the invention appertains, and while I have described the principle of operation, together with the apparatus which I now consider to be the best embodiment thereof, I desire to have it understood that the apparatus shown is merely illustrative and that such changes may be made when desired as fall within the scope of the appended claims.

While the foregoing relates chiefly to the regulation of the admission of materials to the solution of liquid mixture, it is also possible that my device may be used to regulate the temperature or pressure, or both, when either or both of these factors affect the specific gravity of the solution or mixture, and that such regulation may or may not be in combination with the regulation of the admission of the materials to said solution or mixture.

Having thus described my invention, I claim as new and desire to secure by Letters Patent:

1. An apparatus regulating the density of solutions comprising separate means for supplying material to produce continuously a solution or a liquid mixture, a device responsive to the specific gravity of the solution, and means controlled by the device for controlling the materials to maintain the specific gravity of the solution approximately constant.

2. An apparatus regulating the density of solutions comprising separate means for supplying materials to be combined as a solution or liquid mixture, a receptacle through which the solution continuously passes, a device in the receptacle and movable under changes of specific gravity, and electrical means controlled by such device for regulating the relative supplies of the materials to maintain the specific gravity of the solution substantially constant.

3. An apparatus regulating the density of solutions comprising means for continuously supplying materials to produce a solution, a specific gravity balance responsive to the specific gravity of the solution, an electric circuit controlled by the balance, a fluid supply valve controlled by the circuit, and a valve controlled by the said valve to regulate the relative supplies of the materials to maintain the specific gravity substantially constant.

4. An apparatus regulating the density of solutions comprising separate means for supplying materials to produce a solution, a receptacle through which the solution flows continuously, a receptacle containing a standard solution and maintained at substantially the same temperature as the solution supplied to the first-mentioned receptacle, a balance beam, bobs on the beam and submerged in the receptacles, and means controlled by the beam for regulating the supplies of material to maintain the specific gravity of the solution substantially constant.

5. An apparatus regulating the density of solutions comprising means for supplying materials to produce a solution, means for regulating the relative supplies of material, and a specific gravity balance controlling the last-mentioned means, said balance comprising a receptacle through which a continuous flow of the solution is maintained, a receptacle containing a standard solution, a coil through which the solution flows in transit to the first-mentioned receptacle, whereby the solutions in the two receptacles are maintained at substantially the same temperature, a balance beam, and bobs on the balance beam and submerged in the separate receptacles respectively.

LLOYD LOGAN.